(12) United States Patent　(10) Patent No.: US 8,379,043 B1
Paige　(45) Date of Patent: Feb. 19, 2013

(54) METHODS AND APPARATUS FOR DISPLAYING INFORMATION ON THE INSIDE OF A WINDSHIELD

(76) Inventor: David Lester Paige, Columbus, OH (US)

(*) Notice: Subject to any disclaimer, the term of this patent is extended or adjusted under 35 U.S.C. 154(b) by 0 days.

(21) Appl. No.: 13/425,358

(22) Filed: Mar. 20, 2012

(51) Int. Cl.
*G09G 5/00* (2006.01)
*G09G 5/02* (2006.01)
*G02F 1/1335* (2006.01)
*G05D 1/00* (2006.01)

(52) U.S. Cl. ........ 345/589; 345/581; 345/632; 345/204; 349/11; 349/113; 701/1; 701/408

(58) Field of Classification Search .................. 345/418, 345/581, 632–633, 642, 204–205, 690, 905, 345/8–9, 63; 349/5, 11, 113; 701/1, 408, 701/458–460
See application file for complete search history.

(56) References Cited

U.S. PATENT DOCUMENTS

| | | | |
|---|---|---|---|
| 6,100,943 A * | 8/2000 | Koide et al. ...................... | 349/11 |
| 2002/0167589 A1* | 11/2002 | Schofield et al. ............. | 348/148 |
| 2007/0146235 A1* | 6/2007 | Nolan et al. ...................... | 345/7 |
| 2008/0127534 A1* | 6/2008 | Brown ............................. | 40/1 |
| 2009/0150061 A1* | 6/2009 | Chen et al. ...................... | 701/200 |
| 2010/0164702 A1* | 7/2010 | Sasaki et al. .................. | 340/438 |
| 2012/0044337 A1* | 2/2012 | Mauderer et al. ............... | 348/77 |

* cited by examiner

*Primary Examiner* — Wesner Sajous
(74) *Attorney, Agent, or Firm* — Richard C. Litman

(57) ABSTRACT

An apparatus and method allows a driver to read a map, directions or text while driving a car without taking their eyes away from the road. An electronic display device may be mounted to, or made integrally with, a dashboard of an automobile. The electronic display device may be programmed to display inverted (mirror image) information thereupon. When the electronic display is disposed on the automobile's dashboard, the windshield may reflect the inverted image as a normal scene for the driver to visualize. Since the image is displayed on the windshield, the driver can see the image without having to take their eyes off the road.

4 Claims, 2 Drawing Sheets

- SPEED DATA DISPLAY
- RADIO STATION DATA DISPLAY
- FUEL DATA DISPLAY
- GEOGRAPHIC DATA DISPLAY

METHODS AND APPARATUS FOR DISPLAYING INFORMATION ON THE INSIDE OF A WINDSHIELD

BACKGROUND OF THE INVENTION

The present invention relates to automotive accessories and, more particularly, to methods and apparatus to invert text or images that are displayed in normal scene inside a windshield, allowing a user to read a reflected map, for example, without taking their eyes off the road.

Automobiles include more and more features that can often be a distraction to drivers. This has proven to be such an issue that many states have laws or considering laws to penalize distracted driving. Often, when using a map or a GPS device, a driver takes their eyes off the road to focus on the map or GPS to determine where to go. This shift of focus away from the road may cause accidents or other mishaps while driving.

As can be seen, there is a need for an improved method for reviewing information while keeping one's eyes on the road.

SUMMARY OF THE INVENTION

In one aspect of the present invention, a method for viewing information while operating a motor vehicle comprises displaying information on an electronic display device, the information being displayed as an inverted image; reflecting the inverted image of the electronic display device onto an inside of a windshield of the motor vehicle; and viewing a reflected image as a normal scene on the windshield.

In another aspect of the present invention, an electronic display device comprises software adapted to display information as an inverted image on a display thereof; and a mount adapted to attach the electronic display device onto a vehicle dashboard with the display facing a windshield of the vehicle.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an apparatus and method for allowing a driver to read a map, directions or text while driving a car without taking their eyes away from the road. An electronic display device may be mounted to, or made integrally with, a dashboard of an automobile. The electronic display device may be programmed to display inverted (mirror image) information thereupon. When the electronic display is disposed on the automobile's dashboard, the windshield may reflect the inverted image as a normal scene for the driver to visualize. Since the image is displayed on the windshield, the driver can see the image without having to take their eyes off the road.

Figure 1:
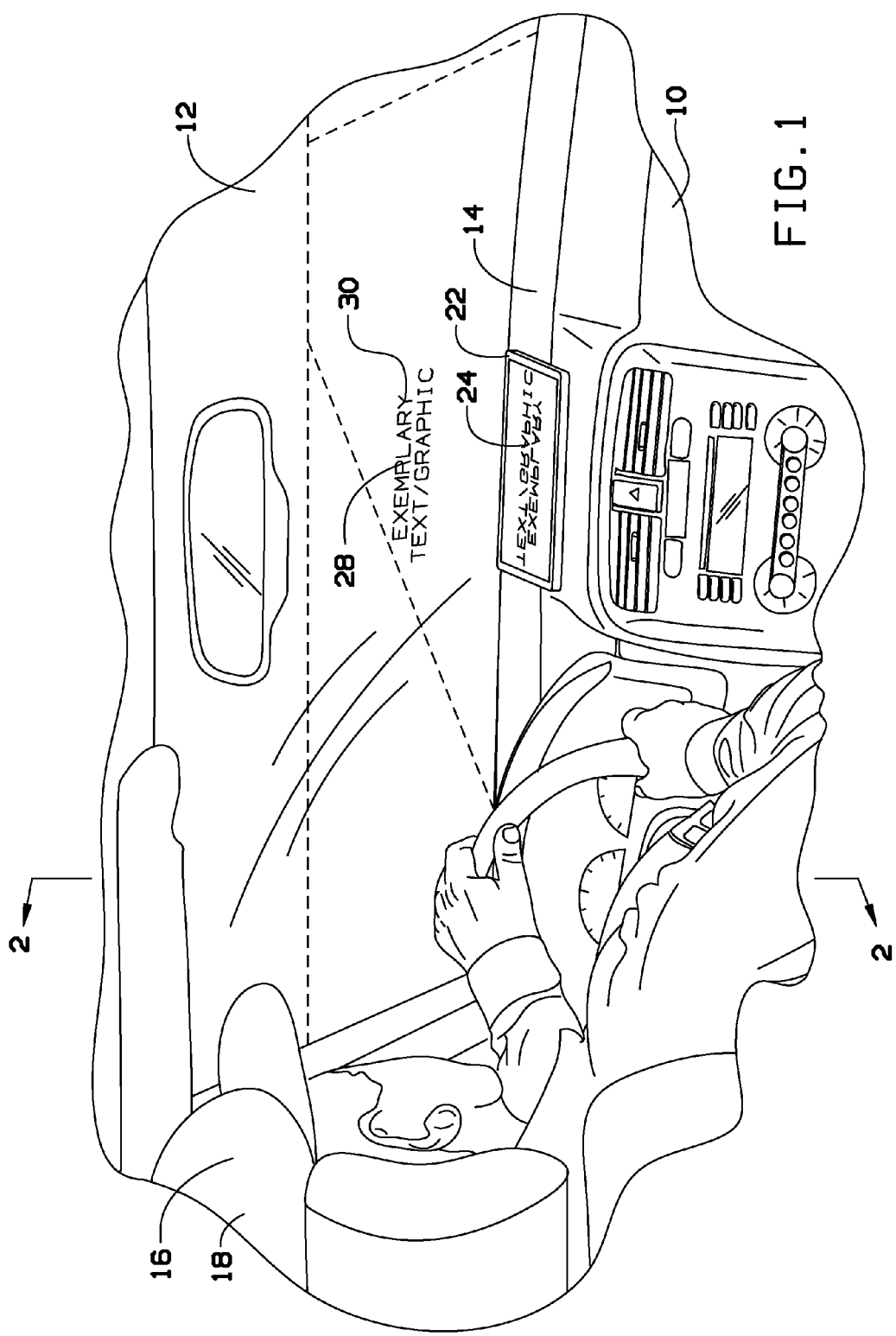
FIG. 1 is a perspective view of a windshield-displayed dashboard supplied inverted information device and method according to an exemplary embodiment of the present invention.
Figure 2:
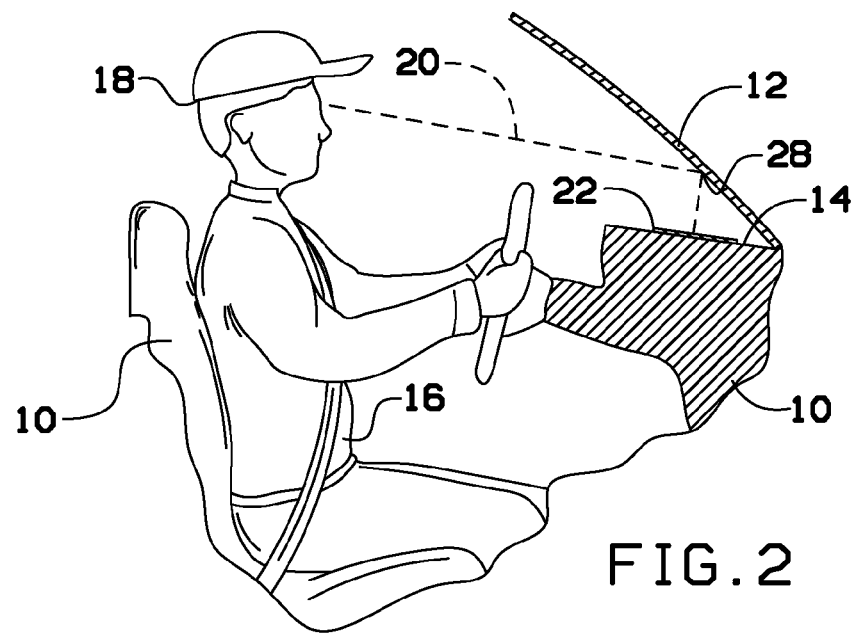
FIG. 2 is a cross-sectional view taken along line 2-2 of FIG. 1.
Figure 3:
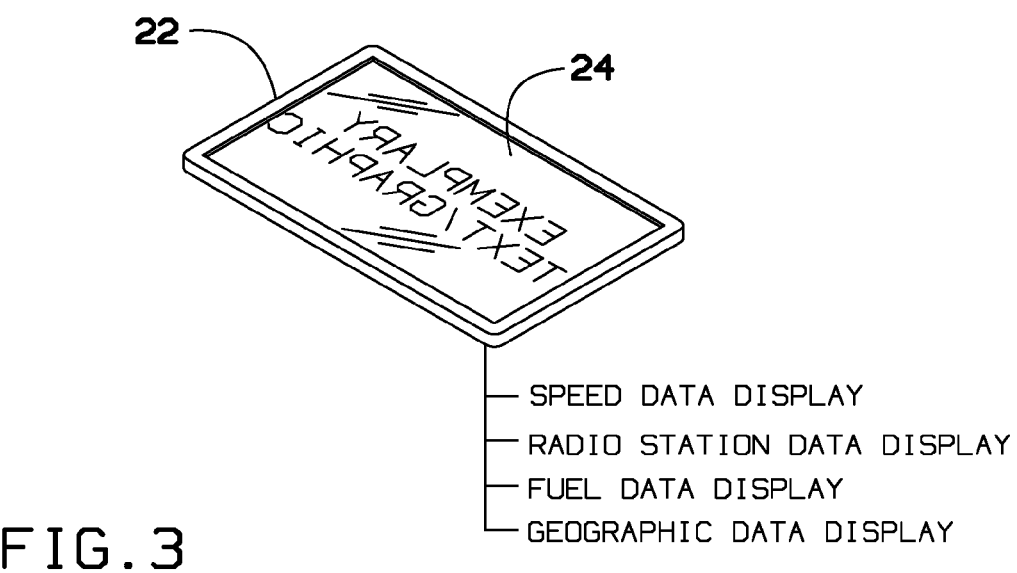
FIG. 3 is a perspective view of an inverted information display device according to an exemplary embodiment of the present invention.

Referring to FIGS. 1 through 3, a vehicle 10 may include a windshield 12 extending upward from a dashboard 14. An electronic display device 22, such as a smart phone, tablet computer, iPad®, or the like, may be disposed on the dashboard 14. The electronic display device 22 may include a mount (not shown) to keep the device 22 from moving on the dashboard 14. The mount may include, for example, hook and loop fasteners, a bracket, or the like.

The electronic display device 22 may display an inverted image 24 that may shine upon a reflection point 28 on the windshield 12. A reflected display 30 may be visible as a normal scene, due to the reflection of the inverted display 24.

An operator 16 of the vehicle 10 may not need to move their head 18 or look away from the road to have a line of sigh 20 to see the reflected display 30 on the windshield 12. This results in enhanced to the operator 16 and others on the road.

The electronic display device 22 may be a portable electronic display device, such as a tablet computer, or may be integrated into the automobile dashboard similar to modern day factory installed GPS devices. However, unlike factory installed GPS devices, which are often displayed below the dashboard, the user does not have to look away from the road to see the reflected display.

In some embodiments, tinting may be added to a lower portion of the windshield 12 to aid in visualization of the reflected display 30. In some embodiments, the electronic display device 22 may have an adjustable brightness level, where the intensity of light can be controlled to provide a proper reflection on both sunny days and night driving conditions. The electronic display device may be designed to have appropriately contrasting colors so that the reflected display may be sharp and legible. In some embodiments of the present invention, the electronic display device may have a sensor to detect ambient brightness and adjust the display brightness accordingly.

The electronic display device 22 may display various items of information. For example, the electronic display device 22 may display a map, speed data, radio station data, fuel data, or the like.

The present invention includes software, written in one or more computer codes and disposed on a computer readable medium that may create the appropriate inverted images for display. The software may include functionality to display the various information data as described above. In some embodiments, the electronic display device may include its own GPS information for display. In some embodiments, the electronic display device may interact with the vehicle to receive and display vehicle information, such as speed data, radio station data, fuel data and the like.

It should be understood, of course, that the foregoing relates to exemplary embodiments of the invention and that modifications may be made without departing from the spirit and scope of the invention as set forth in the following claims.

What is claimed is:

1. A method for viewing information while operating a motor vehicle, the method comprising:
    displaying information on a portable electronic display device, the information being displayed as an inverted image, wherein the inverted image is created with a software application of the portable electronic device, the software application having computer code, disposed on a computer readable medium, and adapted to create the inverted image;

securing the portable electronic display device onto the dashboard of the motor vehicle;

reflecting the inverted image of the portable electronic display device onto an inside of a windshield of the motor vehicle; and viewing a reflected image as a normal scene on the windshield.

2. The method of claim 1, further comprising varying brightness of the inverted image on the portable electronic display device depending on driving conditions.

3. The method of claim 1, wherein the inverted image includes at least one of speed data, radio station data, fuel data and geographic data.

4. The method of claim 1, wherein the reflected image is disposed on the windshield within a driver's normal line of sight.

* * * * *